Feb. 10, 1970    L. W. CORNELL    3,494,020
WELDING BACKUP TAPE
Filed Dec. 5, 1966

INVENTOR.
LEW WALLACE CORNELL
BY
Carpenter, Kinney & Boulter
ATTORNEYS

United States Patent Office 3,494,020
Patented Feb. 10, 1970

3,494,020
WELDING BACKUP TAPE
Lew Wallace Cornell, Mount, Minn., assignor to Minnesota Mining and Manufacturing Company, St. Paul, Minn., a corporation of Delaware
Filed Dec. 5, 1966, Ser. No. 599,235
Int. Cl. B23k 5/22
U.S. Cl. 29—491                                    8 Claims

ABSTRACT OF THE DISCLOSURE

A welding backup tape containing a carbon scavenger such as a metal oxide, a salt of an oxy acid, an alkali or alkaline earth metal fluoride, which serves to minimize carbon pickup in the weld metal thus reducing the tendency of welds, particularly those formed in stainless steel, to corrode.

---

This invention relates to improved flexible tapes useful as a backing means in the fusion welding of metals.

In the formation of fusion butt welds of metal articles, particularly where the weld joint must extend through the thickness of the pieces to be joined, it has been conventional to form the seam with two or more weld passes, often one from each side of the joint. More recently it has been proposed to use flexible welding backup tapes to make possible the welding through the thickness of a joint in one pass, the tape serving as a retaining means to prevent dripping away or burning through of the molten weld material. For example, in my copending application Ser. No. 458,908, filed May 26, 1965, I disclosed a unitary tape formed from a flexible backing coated with adhesive having adhered to the central portion of the adhesive side, a strip of flexible heat resistant or refractory material comprised of inorganic particles bonded together with a minor amount of a flexible organic binder. This flexible tape can be applied over one side of the seam and is conformable to the shape of the metal articles to be joined. The central refractory strip is suitable for supporting the molten weld material during the welding operation. Other welding backup tapes which have been suggested, primarily for light-duty welding, are those shown in British Patent 817,699, issued Aug. 6, 1959, and U.S. Patent 3,001,057 (Hackman et al.) issued Sept. 19, 1961. The British patent suggests the use of glass cloth or metal foil backings coated with pressure-sensitive adhesives as weld backings, whereas the Hackman et al. patent teaches the use of a narrow glass cloth tape applied to another wider adhesive coated backing with the adhesive sides in face to face contact, at column 2, lines 47–57.

In each of these tape constructions the adhesive which is used to apply the tape to the weld joint to be formed, or the case of my above-mentioned tape, the refractory backing itself, includes organic or carbon-containing materials. These carbonaceous materials tend to decompose during the welding operation, causing an undesirable increase in the carbon content of the metal in and around the weld joint. This increase in the carbon content of the metal is particularly objectionable in the case of stainless steel where the result is a marked increase in the tendency of the metal in the weld area to corrode.

The present invention provides welding backup tapes which minimize or eliminate the buildup of carbon in and around weld joints formed with the use of the welding backup tapes. The invention is particularly applicable to the abovedescribed tapes disclosed in my copending application in which the refractory weld supporting strip itself contains carbon-containing materials. The objectives of this invention are met by including in the tape a small amount of a carbon scavenger which will prevent carbon from entering the molten weld metal. The mechanism by which the scavengers function is not fully understood, but it is theorized that they serve to either oxidize the carbon or carry it away in a liquid phase (i.e., a flux) which is immiscible with the molten metal, or both. The preferred carbon scavengers are readily reducible metal oxides, salts of oxy acids, and alkali or alkaline earth metal fluorides. The preferred materials are those which withstand the welding conditions without decomposing into chemicals deleterious to the weldment or hazardous to the health of the weldor. Examples of the preferred scavengers are ammonium nitrate, potassium permanganate, potassium fluoride, sodium dichromate, and ferric oxide. Many further agents will be apparent to those skilled in the art.

Figure 1:
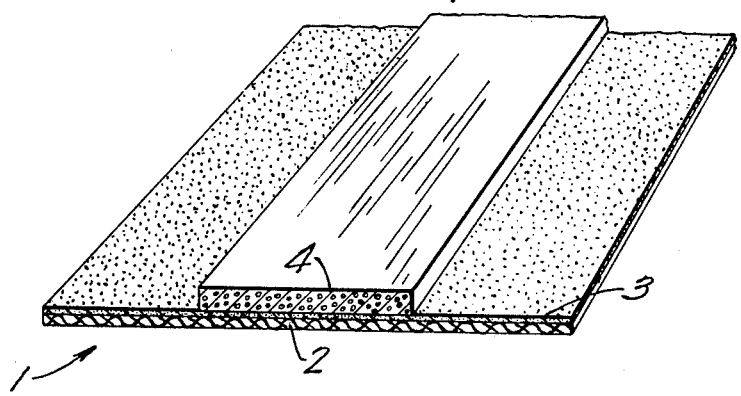
FIGURE 1 is a fragmental perspective view of a tape of this invention.

In FIGURE 1 there is seen composite tape 1 formed from a backing 2 coated on one side with an adhesive 3, preferably a pressure-sensitive adhesive. A self-supporting flexible strip of refractory material 4 is affixed to the central portion of the backing. The exposed surfaces of the adhesive may be protected by suitable release liners (not shown) for shipment and storage.

Figure 2:
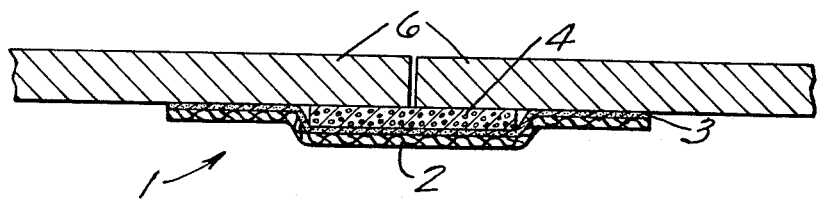
FIGURE 2 is a fragmental cross-sectional view of a seam and backing tape in position before welding.

In FIGURE 2 are seen two pieces of metal 6 in position to be joined by welding. The tape is attached by positioning the refractory strip 4 centrally over the seam to be formed and adhering the adhesive outer edges of the tape to the metal on opposite sides of the seam line.

Backing 2 may be glass fabric, metal foil, paper treated with a flame retardant composition, or fabric formed from fibers such as cotton, nylon or rayon, preferably treated with flame retardant compositions.

The adhesive employed is preferably an aggressively tacky pressure-sensitive adhesive such as those based on mixtures of styrene-butadiene copolymer rubbers and acrylate-acrylic acid copolymers. Other adhesives such as dimethylsilane polymer gums tackified with a silicon resin, crude rubber adhesives, acrylic homopolymer or copolymer adhesives or the like can be substituted. For ease in application, it is preferred to use pressure-sensitive adhesives, although thermoplastic adhesives tackified by heating may be used if desired.

The particulate refractory material used in making the strip 4 is preferably a non-metallic inorganic material. Suitable materials include silicon carbide, aluminum oxide, silicon dioxide, glass beads, glass cullet, fired clay bubbles, particles of welding flux, and the like; glass cullet and welding fluxes being preferred for tapes used in the welding of stainless steel. The particles can be in a size range of from about 50 to about 4,000 microns, optimum results being obtainable by using particles ranging in size between 200 and 2,000 microns. The particulate materials are bound together with a small amount of elastomeric or flexible, stretchable, resinous material into which the carbon scavenger is added. Normally the binder material should be present in an amount less than about 10% by weight of the refractory material in order to minimize gas and free carbon formation due to burn off of the elastomer during welding, about 1 to 2% by weight of the refractory being a preferred amount. The refractory strip 4 is usually 1.5 to 6.5 mm. in thickness, about 3 mm. being preferred, and 0.5 to 5 cm. in width. The carbon scavenger is preferably present in amount of about 1 to 2 times the weight of the binder, lesser amounts, down to about one-half the weight of the binder, of scavengers which are very strong oxidizing agents being effective.

The preferred method of making the refractory strip involves thoroughly mixing the particulate refractory material with a suspension or solution of elastomer containing the carbon scavenger in a volatile organic solvent or as a latex. This mixture is then formed into the desired shape and dried. Various methods, such as extrusion, casting or pressure molding, can be used to form the strips into the desired shape.

In the case of tapes of the type shown in British Patent 817,699, the carbon scavenger can be mixed with the adhesive, while in the case of the above noted Hackman et al. construction the oxidizer may be contained in the glass cloth as an impregnant to prevent carbon formed from the adhesive from entering the molten weld metal.

Where the carbon scavenger is a metal oxide, it is preferred to use the oxide of a metal which will not seriously alter the characteristics of weld metal by alloying, or otherwise. Also, the oxide should be reducible by carbon at temperatures below about 1500° C. Examples of such oxides are iron oxide, nickel oxide, chromium oxide, and manganese oxide.

Ammonium nitrate is a preferred carbon scavenger because of its effectiveness in reducing carbon without leaving a residue after welding or evolving noxious gases, and is relatively non-hygroscopic, thus resulting in more stable tapes. Moreover, where a latex binder is used, the ready solubility of ammonium nitrate makes it easy to incorporate into the tapes, and it has a minimum tendency to cause unwanted coagulation of the latex.

The invention will be further illustrated by the following examples wherein all parts are given by weight unless otherwise indicated.

EXAMPLE 1

An aluminum foil backing tape is formed by coating .003 inch (.076 cm.) thick soft aluminum foil with a pressure-sensitive adhesive formed from a mixture of 62.4% by weight of a styrene-butadiene rubber which is a copolymer of 3 parts by weight butadiene and 1 part styrene, and 37.6% by weight of a copolymer of 95.5% by weight iso-octyl acrylate and 4.5% acrylic acid.

A latex binder was prepared by mixing the following ingredients:

| | Parts |
|---|---|
| Crude rubber latex, 60% solids, containing 9.6 parts alkyl aryl polyether alcohol stabilizer, 50% solids in water per 100 parts latex | 100 |
| 2:1 blend of zinc dibutyldithiocarbamate and 2,2' methylene bis (4-methyl-6-tert. butylphenol), both 50% solids in water | 2 |
| Ammonium nitrate solution: 1000 parts $NH_4NO_3$ in $H_2O$, 60% solids; 3 parts alkyl aryl sodium sulfonate detergent; 3 parts casein solution (15 parts dry casein, 90 parts $H_2O$, 9 parts concentrated $NH_4OH$) | 165 |

One hundred parts glass cullet, 150 to 1,000 micron particle size, average about 800, and 5 parts of the latex mixture were mixed, cast into a strip ¾ inch (1.9 cm.) wide, and dried. The resulting flexible strip was adhered to the central portion of a 2 inch (5.1 cm.) wide strip of the adhesive coated side of the aluminum backing. A similar tape was prepared omitting the ammonium nitrate as a control. The tapes were used as a backup in butt-welding of stainless steel containing 0.04% carbon. The weld formed using the control tape contained about 0.3% carbon, whereas that formed using the ammonium nitrate-containing tape contained 0.04% carbon.

EXAMPLE 2

One hundred gms. of commercial welding flux (Lincoln ST–100 welding flux) shown by spectrographic analysis to contain mainly silicon and manganese oxides with some free silicon and/or manganese metal, and containing lesser amounts of aluminum, iron, calcium, magnesium, chromium, and nickel oxides, and a minor amount of sodium silicate binder, and having a particle size of about 125 to 1600 microns, was treated with 10 gms. of a 20% solution of sodium nitrate in water, mixed thoroughly, and the water removed by air drying. The treated flux was further mixed with 22.2 gms. of a 9% solution in heptane of polyisobutylene of approximately 120,000 molecular weight (Vistanex L–120). From this mixture were cast 1 inch (2.54 cm.) wide by ⅛ inch (3.2 mm.) thick layers on .002 inch thick aluminum foil. The strips of refractory on the foil were mounted in the center of 3 inch strips of silicone adhesive coated glass cloth tape. The composite tape was used as a backup in welding in a single pass of 1/16 inch thick stainless steel containing 0.06% carbon. The weld metal was found to contain 0.15% carbon.

EXAMPLE 3

A tape identical to that of Example 2 was prepared, except that the welding flux was treated with 9.4 gms. of 20% ammonium nitrate in water instead of the $Na_2NO_3$. A weld using the tape formed on stainless steel containing 0.08% carbon was also found to contain 0.08% carbon.

EXAMPLE 4

A tape was prepared identical to that of Example 2 except that the welding flux was treated with 15 gms. of a 20% solution of magnesium nitrate hexahydrate in water. Analysis of a weld formed on stainless steel containing 0.08% carbon using the tape showed that the weld metal contained 0.07% carbon.

EXAMPLE 5

A tape was prepared identical to that of Example 2, except that the welding flux was treated with 20 gms. of a 20% solution of silver nitrate in water. Analysis of a weld formed on stainless steel containing 0.08% carbon using the tape showed the weld metal to contain 0.09% carbon.

EXAMPLE 6

One hundred garms of the ST–100 welding flux of Example 2 were mixed three successive times with 15.4 gms. of a 6.5% solution of potassium chlorate in water and dried, to give a final concentration of 3% by weight of the potassium chlorate on the welding flux. The treated flux was mixed with 22.2 gms. of a 9% solution of Vistanex L–120 (see Ex. 2) in heptane and made into ⅛″ x 1″ strips as in Example 2, except that no aluminum foil was used. The strips were mounted on glass cloth tape. Analysis of a weld formed in stainless steel containing 0.08% carbon using the tape showed the weld metal to contain 0.09% carbon.

EXAMPLE 7

A tape was prepared identical to that of Example 6, except that the welding flux was treated with 17.7 gms. of a 11.3% solution of potassium dichromate in water. Analysis of a weld formed in stanless steel containing 0.08% carbon, using the tape, showed the weld metal to contain 0.12% carbon.

EXAMPLE 8

A tape was prepared identical to that of Example 2 except that the welding flux was treated with 13.3 gms. of a 15% solution of potassium permanganate in water, and the dried mixture with 20 gms. of a 10% solution of Vistanex L–120 (see Ex. 2) in heptane. Analysis of a weld formed using the tape on stainless steel containing 0.06% carbon showed the weld metal to contain 0.09% carbon.

EXAMPLE 9

A tape was prepared identical to that of Example 8, except that the welding flux was treated with 5 gms. of a 40% solution of potassium fluoride in water. Analysis of a weld formed using the tape on stainless steel containing 0.06% carbon showed the weld metal to contain 0.11% carbon.

EXAMPLE 10

One hundred gms. of the ST-100 welding flux of Example 2 were dry mixed with 10 gms. of pure iron oxide powder ($Fe_2O_3$). This dry mix was then mixed with 24.4 gms. of a 9% solution of Vistanex L-120 (see Ex. 2) in heptane and made into strips as described in Example 6. Analysis of welds formed using the tape as a backup on stainless steel containing 0.07% carbon showed the weld metal to contain 0.09% carbon.

What is claimed is:

1. In a tape useful as a backing means in metal welding comprising an elongated flexible heat resistant backing having a face thereof coated with an adhesive, the improvement which comprises a finely divided scavenger for carbon on said tape whereby carbonization of the weld metal during welding due to release of carbon from said tape is minimized.

2. A tape according to claim 1 wherein a flexible elongated strip of narrower width than said backing and comprising inorganic material and said carbon scavenger bound together with a minor amount of an organic binder is adhered to the central portion of the adhesive-coated face of said backing, said carbon scavenger being present in amount equal to at least about one-half the weight of said binder.

3. A tape according to claim 2 wherein said elongated strip comprises glass cloth containing said carbon scavenger.

4. A tape according to claim 1 wherein said carbon scavenger is selected from the group consisting of readily reducible metal oxides, salts of oxy acids, alkali fluorides, and alkaline earth metal fluorides.

5. A tape according to claim 4 wherein said carbon scavenger is ammonium nitrate.

6. A tape according to claim 2 wherein said backing is aluminum foil and said inorganic material is particulate glass bound together with an elastomeric binder.

7. A welding backup tape comprising a flexible flame resistant backing having a face thereof coated with an aggressively tacky pressure-sensitive adhesive, said backing having a width between about 2.5 and 10 centimeters and a flexible elongated strip of narrower width than said backing attached to the central portion of said adhesive coated face, said strip being formed from inorganic particles ranging in size between about 50 and 4,000 microns, bound together with a flexible, stretchable organic binder which comprises between about 0.5 to 10 percent of the volume of said strip, said strip being about 2 to 6.5 mm. thick and about 0.5 to 5 cm. wide, said strip having uniformly distributed therethrough a carbon scavenger in an amount ranging from about 0.5 to 2 times the weight of said organic binder, said scavenger being selected from the group consisting of metal oxides readily reducible by carbon, salts of oxy acids, alkali fluorides, and alkaline earth metal fluorides.

8. A method of welding stainless steel comprising placing pieces of stainless steel to be welded in abutting relation on opposite sides of a seam to be formed, applying to one side of said seam a backup tape according to claim 1, said tape being approximately centered along said seam line to be formed and held in position by adhesive contact between said backing and the metal pieces on opposite sides of the seam line, fusion welding said metal pieces along said seam line, and removing said backup tape after solidification of the weld material.

References Cited

UNITED STATES PATENTS

| | | | |
|---|---|---|---|
| 2,820,427 | 1/1958 | Chyle | 228—50 |
| 3,372,852 | 3/1968 | Cornell | 228—50 |

JOHN F. CAMPBELL, Primary Examiner

U.S. Cl. X.R.

228—50